United States Patent [19]

Wicks

[11] Patent Number: 4,981,082
[45] Date of Patent: Jan. 1, 1991

[54] RAILWAY HIGHWAY VEHICLE

[75] Inventor: Harry O. Wicks, Hamburg, N.Y.

[73] Assignee: Railmaster System, Inc., Elmhurst, Ill.

[21] Appl. No.: 183,344

[22] Filed: Apr. 18, 1988

Related U.S. Application Data

[63] Continuation of Ser. No. 542,264, Oct. 17, 1983, abandoned, which is a continuation-in-part of Ser. No. 469,215, Feb. 24, 1983, abandoned.

[51] Int. Cl.$^5$ .............................................. B61D 3/10
[52] U.S. Cl. .................................. 105/4.1; 105/159; 105/215.2; 410/64
[58] Field of Search ............................ 105/3, 4.1–4.3, 105/159, 215.2; 410/45, 53, 56, 64; 213/86, 200

[56] References Cited

U.S. PATENT DOCUMENTS

| | | | |
|---|---|---|---|
| 1,786,463 | 12/1930 | Thomas | 410/56 X |
| 2,036,535 | 4/1936 | Nelson | 410/53 X |
| 2,816,517 | 12/1957 | Candlin, Jr. et al. | 105/4 R |
| 2,826,155 | 3/1958 | Larrson | 105/4 R |
| 2,920,580 | 1/1960 | Williams | 105/4 R X |
| 2,963,986 | 12/1960 | Dobson | 105/159 X |
| 3,081,115 | 3/1963 | Dickey et al. | 410/64 |
| 3,371,622 | 3/1968 | Lich | 105/4 R |
| 4,202,454 | 5/1980 | Browne et al. | 105/215 C X |
| 4,400,121 | 8/1983 | Krull et al. | 410/64 |
| 4,456,413 | 6/1984 | Pavlick . | |
| 4,585,133 | 4/1986 | Cope . | |
| 4,669,391 | 6/1987 | Wicks et al. | 105/4.3 |
| 4,766,818 | 8/1988 | Wicks et al. | 105/4.3 |

FOREIGN PATENT DOCUMENTS 2879955  3/1928  United Kingdom .

Primary Examiner—Johnny D. Cherry
Assistant Examiner—Joseph D. Pape
Attorney, Agent, or Firm—Neuman, Williams, Anderson & Olson

[57] ABSTRACT

A railway train of truck trailers or trailer chassis coupled end to end with the back end of each trailer (and the front end of a following trailer, if any) pivotally supported on the bolster of a railway truck by a subframe having vertically facing load carrying parts engaged by mating parts on the back end of the leading trailer on opposite sides of its centerline. The following trailer is supported by structure either on the forward trailer or pivotally supported by said subframe. When connected in the railway mode, the road wheels of the trailer are supported clear of the tracks.

26 Claims, 13 Drawing Sheets

4,981,082

RAILWAY HIGHWAY VEHICLE

This application is a continuation of application Ser. No. 06/542,264, filed Oct. 17, 1983, now abandoned, which application is a continuation-in-part of application Ser. No. 06/469,215, filed Feb. 24, 1983, incorporated by reference into said continuation-in-part application, now abandoned.

FIELD OF THE INVENTION

The present invention relates to a practical design of a train of highway trailers which are formed of novel highway trailers and railway truck assemblies and which permit flexible operations. In addition, this invention relates to a highway trailer or trailer chassis for railway and highway use which reduces the weight to be carried and therefore reduces the energy required for rail use. More specifically, this invention utilizes highway trailers which are modified to be carried over a rail track by a railway truck assembly which includes an intermodal adapter and a railway truck which may be of a standard design. This design eliminates the need for a flat car in the intermodal rail mode thereby substantially reducing the dead load weight of the train and thus reducing the energy required in the rail mode. In the highway mode, the trailer is not encumbered by excess structural weight and therefore is capable of carrying a load nearly equal to that of a standard piggyback trailer.

BACKGROUND OF THE INVENTION

In piggyback trains, the cross country travel is by rail and the local delivery is by truck. This effects savings of energy and of labor. However, the dead weight of the piggyback flat cars makes up a large portion of the total railway load.

It has previously been proposed to provide novel highway trailers which can be supported upon a track without the use of a piggyback flat car. One such example is shown in U.S. Pat. No. 4,202,454 issued 13 May, 1980. Another prior art design is shown in U.S. Pat. No. 2,963,986 issued 13 Dec., 1960.

OBJECTS AND SUMMARY OF THE INVENTION

It is an object of this invention to utilize railway trucks, which may be of conventional design, the trucks being adapted to be connected to novel trailers via a unique adapter structure. This adapter structure attaches to and swivels on the railway truck bolster in the same way that a rail car would normally attach to and swivel on the truck bolster. In one form of the invention, adjacent ends of the trailers in the train are coupled to a railway truck. The coupling may be made by lifting the trailer and lowering it onto the railway coupling. Alternatively, the coupling may be made by backing the trailer into the railway coupling. When the train is made up, each railway truck supports the back end of a leading trailer and the front end of a following trailer. In other words, the front and back ends of each trailer are supported by a different truck. Upon arriving at its destination, each trailer is lifted off (or backed off) its railway coupling and is connected to a tractor for local delivery by highway.

The trailer is a standard highway trailer except for the modification required for the railway coupling. This modification does not interfere with the highway use and makes only a small addition to the weight of the trailer.

In another form, this invention utilizes an adapter structure which attaches to and swivels on a railway truck bolster in the same way that a railway car would normally attach to and swivel on the truck bolster. The adapter structure has a pair of forks which are horizontally oriented and fit into two sockets beneath and parallel to the rear sill of the trailer frame. The adapter structure also has latches which engage a latch bar transverse to the rear of the trailer frame. The rear end of the trailer frame is fitted with a socket into which a coupler prong from the forward end of a following trailer may enter and be coupled through a coupler pin. The coupler prong and coupler socket allow the leading trailer to roll from side to side and fore and aft as it would on railway tracks in operation. The adapter frame is also provided with antisway bumpers to limit sway of both the leading and following trailer.

By utilizing the above design features, piggyback flat cars may be eliminated and the novel highway trailers of this invention become an active part of the trains, thereby decreasing the weight to be transported by rail and still further increasing the saving of combined railway highway service. When the trailers are connected end-to-end to form a train, they are pulled by a locomotive and the adjacent ends of the trailers in the train are supported by a railway truck assembly, the front end of a following trailer and the rear end of an adjacent leading trailer being supported by a single railway truck and adapter.

The foregoing features, as well as the method of making up a train, will become more apparent from a consideration of the following detailed description taken in conjunction with the accompanying drawings in which various forms of this invention are illustrated.

DETAILED DESCRIPTION

Figure 1:
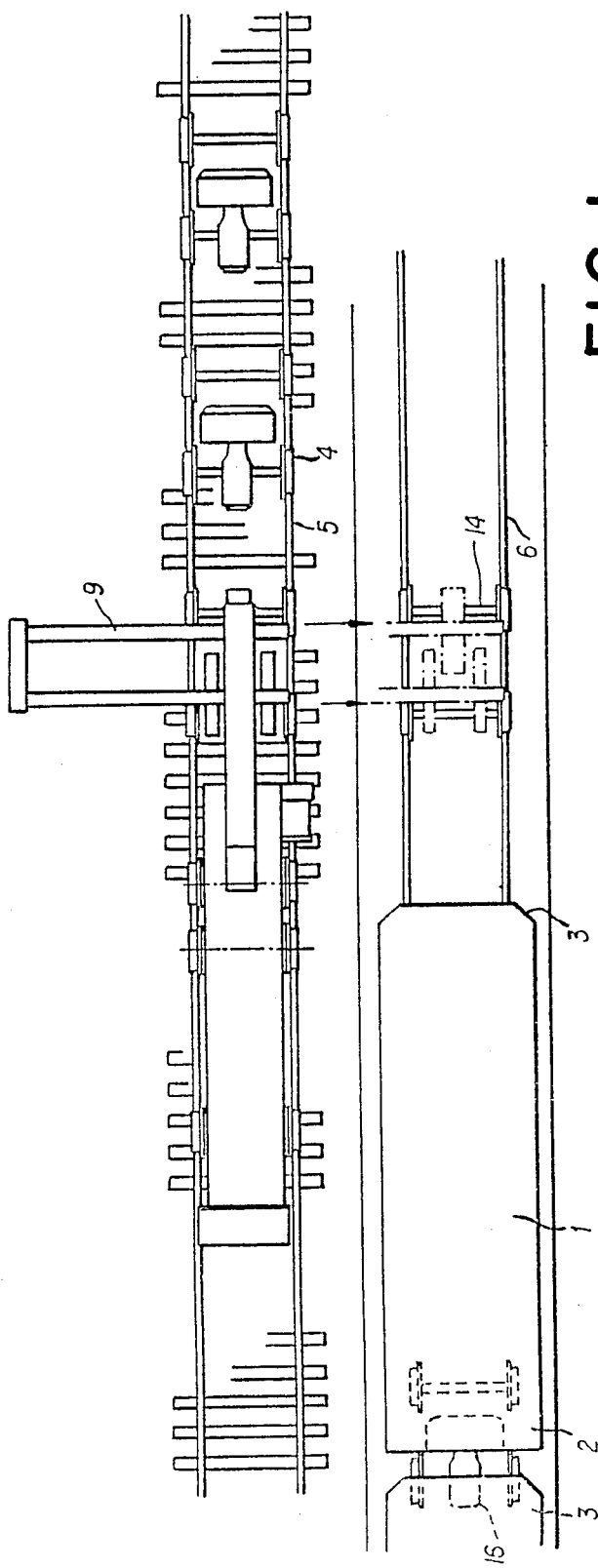
FIG. 1 is a plan view of a crane for moving railway trucks laterally form one track to another.
Figure 2:
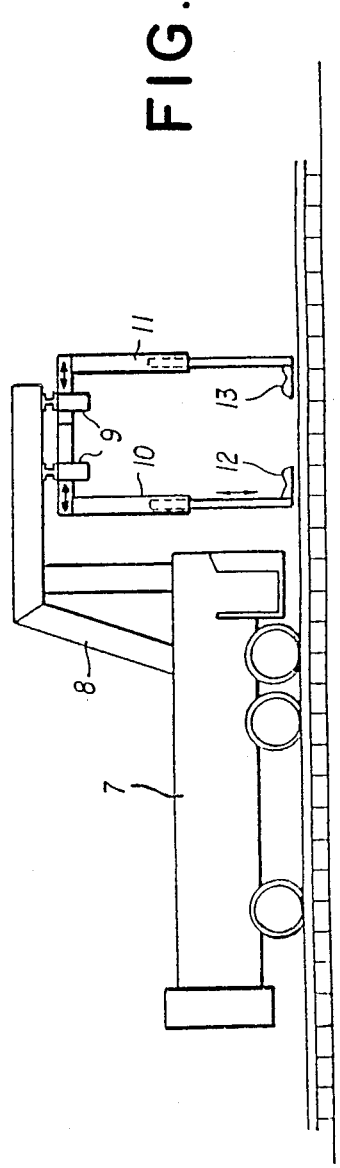
FIG. 2 is a side elevation of the crane shown in FIG. 1.

FIG. 1 shows a train of railway highway trailers 1 in the process of being made up. The back end 2 of the leading trailer is connected to the front end 3 of the following trailer and the adjoining ends 2, 3 are supported by a railway truck 4. The trucks are stored on a railway track 5 and are moved from track 5 to track 6 on which the train is being made up by a crane 7 having a main frame 8 with a crosswise movable carriage 9 at the upper end of the main frame.

At the outer ends of the carriage are depending arms 10, 11 at the lower ends of which are inwardly extending fingers 12, 13 which are specifically designed to extend beneath the axles 14 of the railway truck 4. When in position beneath the axles 14, the arms or the fingers 12, 13 are lifted to elevate the truck clear of the track 5. The truck can then be moved from its position on the track 5 to a position where it can be lowered onto the track 6. After the truck is in position on the track 6, the carriage 9 is retracted to the position shown in full lines in readiness to pick up another truck. The truck which has been moved to the track 6 can then be rolled toward the trailer 1 and a coupling part 16 on the truck telescoped into a mating part to be described at the front end 3 of trailer 1.

Set into the rear sill 15 of the trailer is a complementary coupling means 136 comprising an inverted channel 17 open at its front end 18 and closed at its back end by cross member 19 and having depending sides 20 which flare outwardly at 21 to help guide the rectangular first coupling member 22 of frame 130 into place as the trailer is lowered onto the coupling member 22. The first coupling means 22 has an upwardly facing horizontal surface 134 on which rests the downwardly facing horizontal surface 136 of the complementary coupling means 17. The said walls 132 of the first coupling means 22 mate with the walls 20 of the complementary coupling means 17. After the trailer is lowered onto the coupling 22, locking pins 23 are moved in opposite directions outwardly through registering holes in sides 20 of the coupling member 136 by an oppositely threaded screw 24. When the pins 23 are in locking position, the rear sill of the trailer is positively fixed to the coupling 22 and the weight of the back end of the trailer is carried through center plate thrust bearing 25 to bolster 26 of the truck. Opposite ends of the bolster are supported by side frames 27a and springs 28. In addition to carrying the weight of the trailer load, the truck 4 also has its own railway brakes. The coupling 22 forms part of the structure which is supported by the center bearing 25. The back end of the trailer which is rigidly connected to the coupling 22 is therefore supported on the center bearing in the same manner as a freight car would be supported. Side sway at the back end of the trailer on the truck is limited by the usual stops.

At the center of the center bearing 25 is an upstanding center pin 27 having at its upper end a spherical bearing 29 for supporting the shank 30 of a coupling member 31. The shank 30 extends out the open end of the coupling member 22. At the back end of the shank 30 is a cross member 32 at the opposite ends of which extend inverted channel fork members 33.

Figure 4:
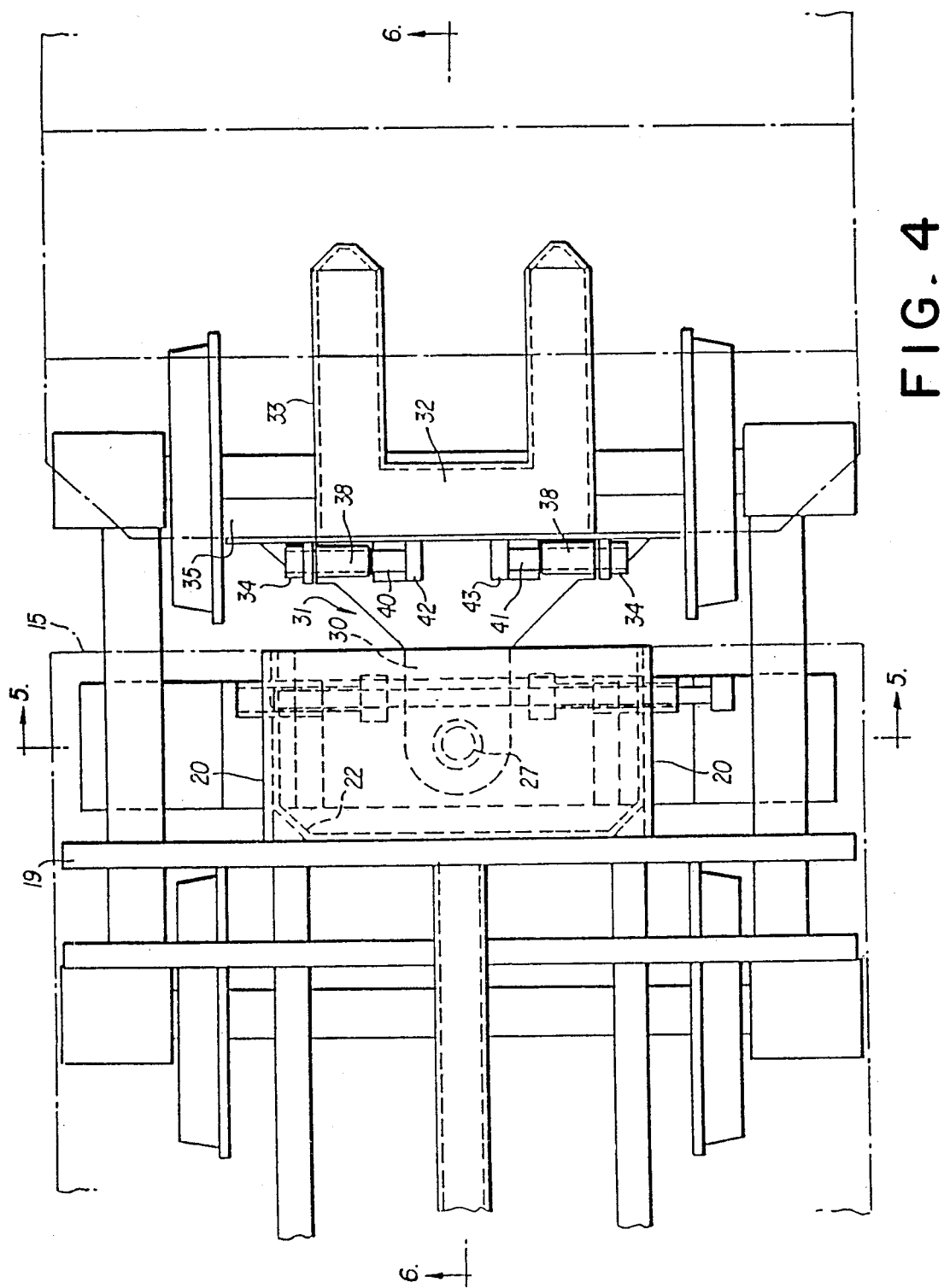
FIG. 4 is a top plan view of a railway truck and of the coupling members on the truck for connection respectively to mating couplings on the front and back ends of adjoining railway highway vehicles.
Figure 5:
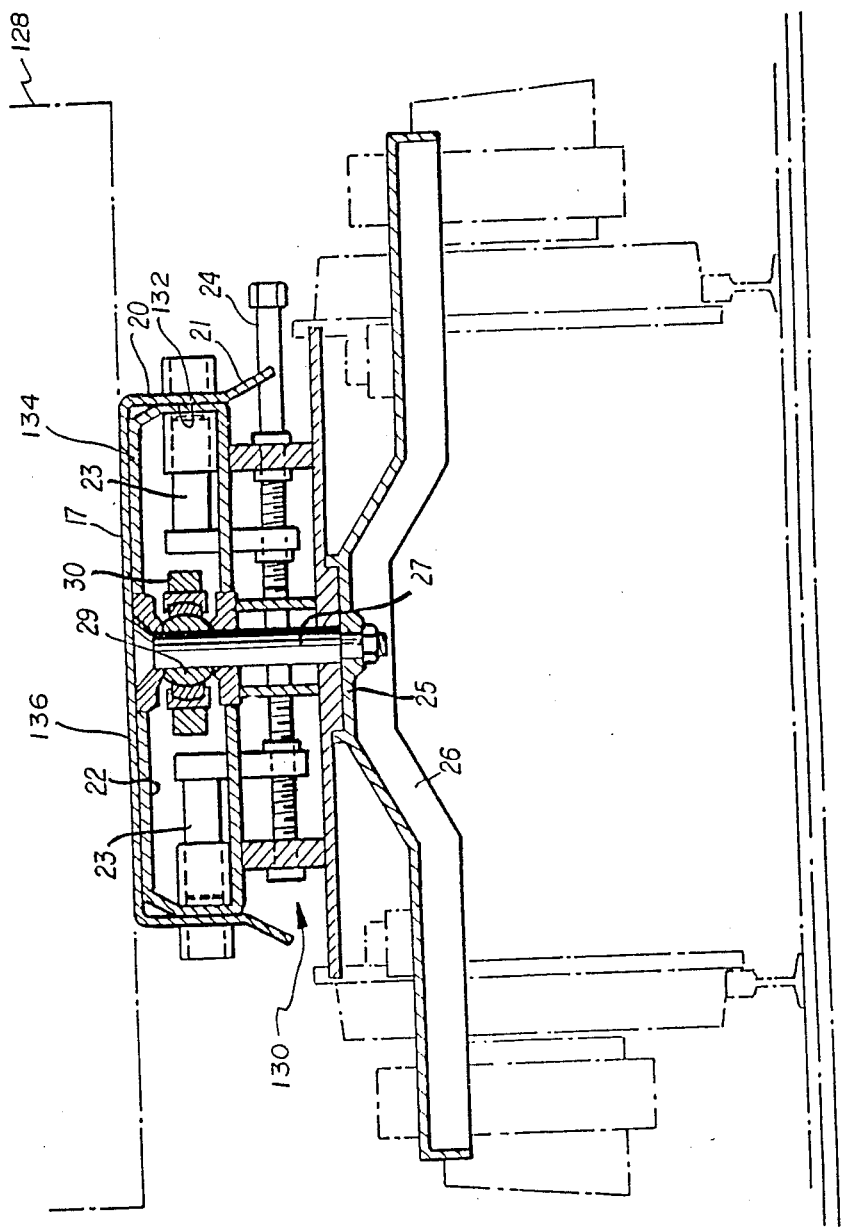
FIG. 5 is a section on line 5—5 of FIG. 4.
Figure 6:
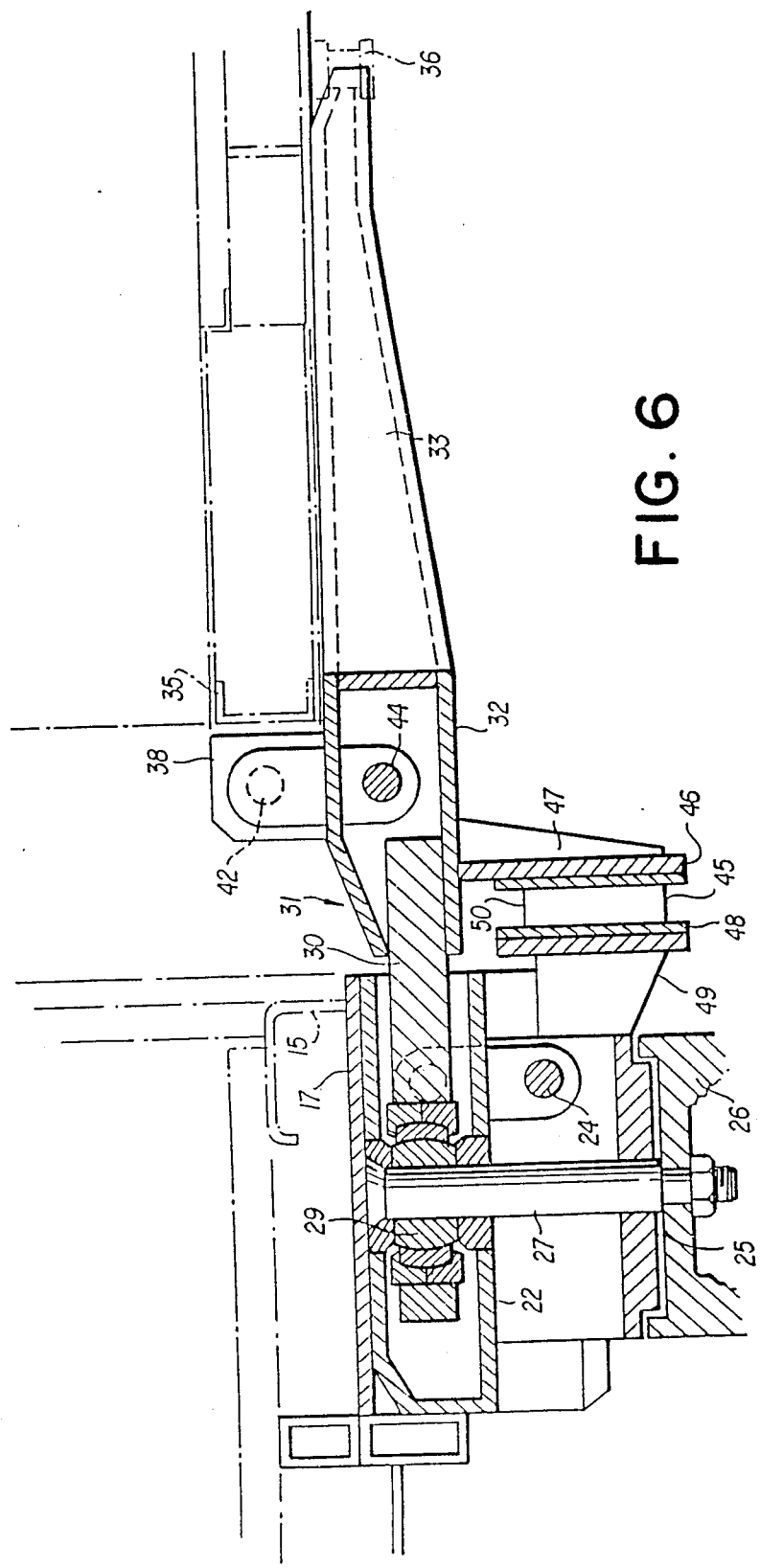
FIG. 6 is a section on line 6—6 of FIG. 4.

As shown in FIG. 4, the coupling 31 fits between two lugs 34 fixed to the front sill 35 of the front end of the following trailer. As shown in FIG. 6, the coupling 31 has forks or prongs 33 which extend back beneath the front end of the trailer almost to the fifth wheel coupling pin 36 of the trailer but since the pin 36 is on the center line of the trailer and the prongs 33 are spaced on opposite sides of the center line of the trailer, there never is any contact between the coupling 31 and the fifth wheel pin of the trailer. When the coupling element 31 is in connected or coupled position on the front end of the following trailer, lugs 38 on the coupling are received between the lugs 34 (FIG. 4) on the front sill 35 of the trailer. The lugs 38 project above the coupling 31 and are stopped against the front sill 35 of the trailer (FIG. 6). Locking pins 40, 41 carried respectively at the upper ends of arms 42, 43 and driven in opposite directions by oppositely threaded screw actuator 44 are extended through aligned holes in the lugs 38 and 34 after the coupling element 31 is properly positioned on the trailer. Once the locking pins are in place, the front end of the following trailer is rigidly coupled to the coupling element 29 to allow tilting of the following trailer in all directions. Coupling element 31 is resiliently supported by a shear sandwich mounting 45 having one plate 46 connected to bracket 47 fixed to coupling element 31 and its other plate 48 connected by bracket 49 to center plate 25. The rubber body 50 sandwiched between and bonded to plates 46 and 48 resiliently restrains movement of the front end of the following trailer relative to the back end of the leading trailer. The sandwich mounting also centers the element 31 prior to coupling to a following trailer.

Figure 7:
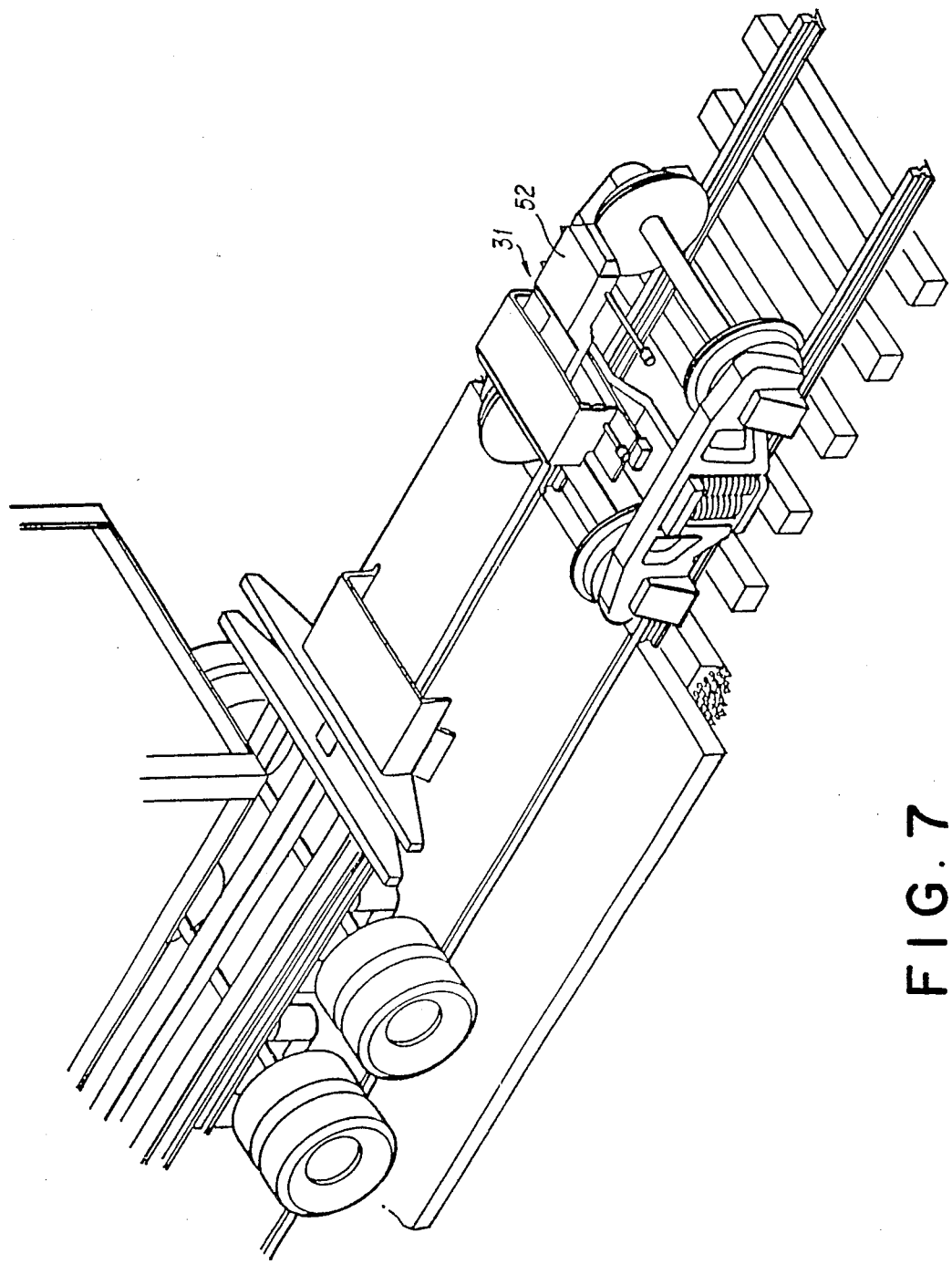
FIG. 7 is a perspective of a modification of FIG. 3.
Figure 8:
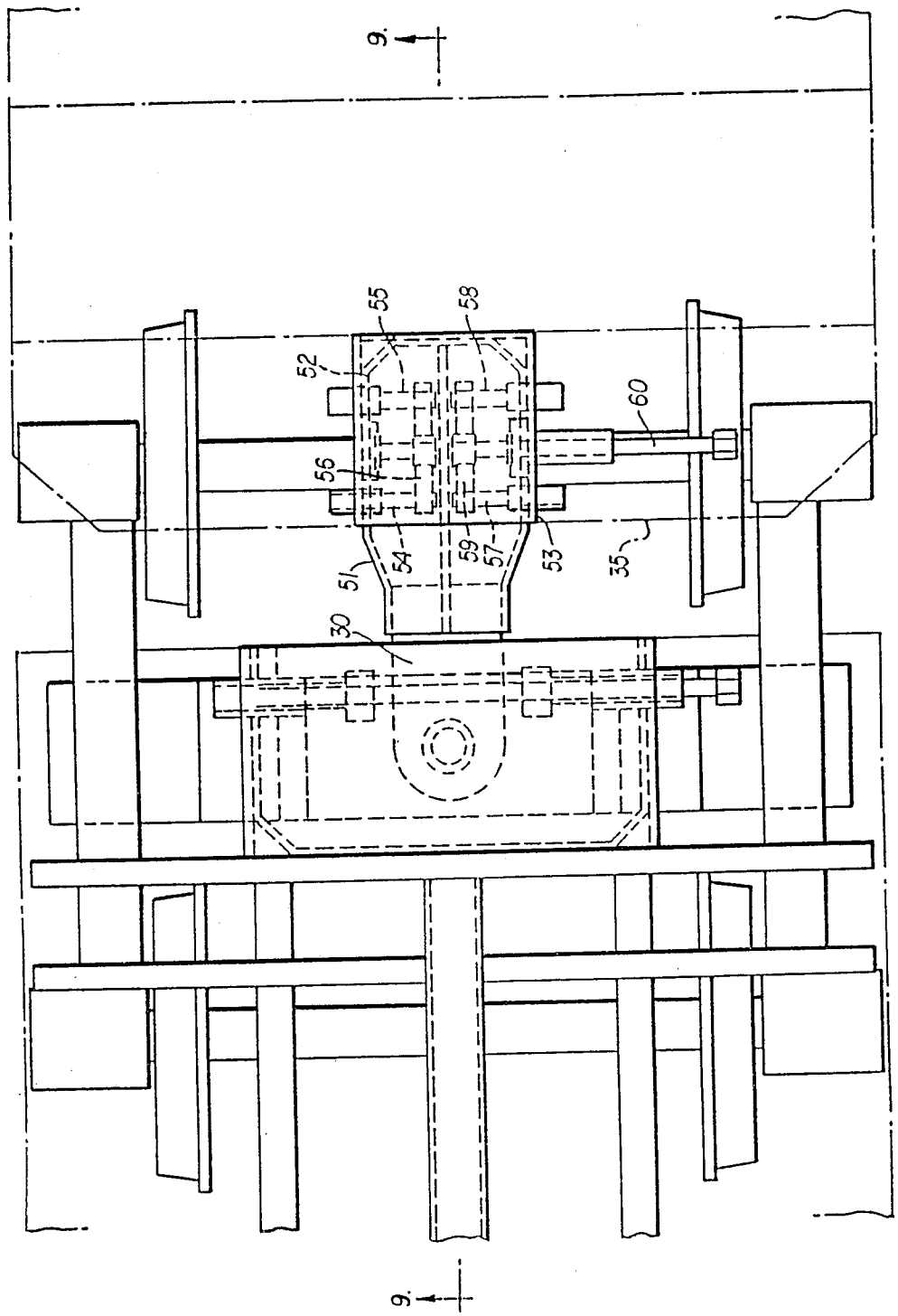
FIG. 8 is a top plan view of a modification of FIG. 4.
Figure 9:
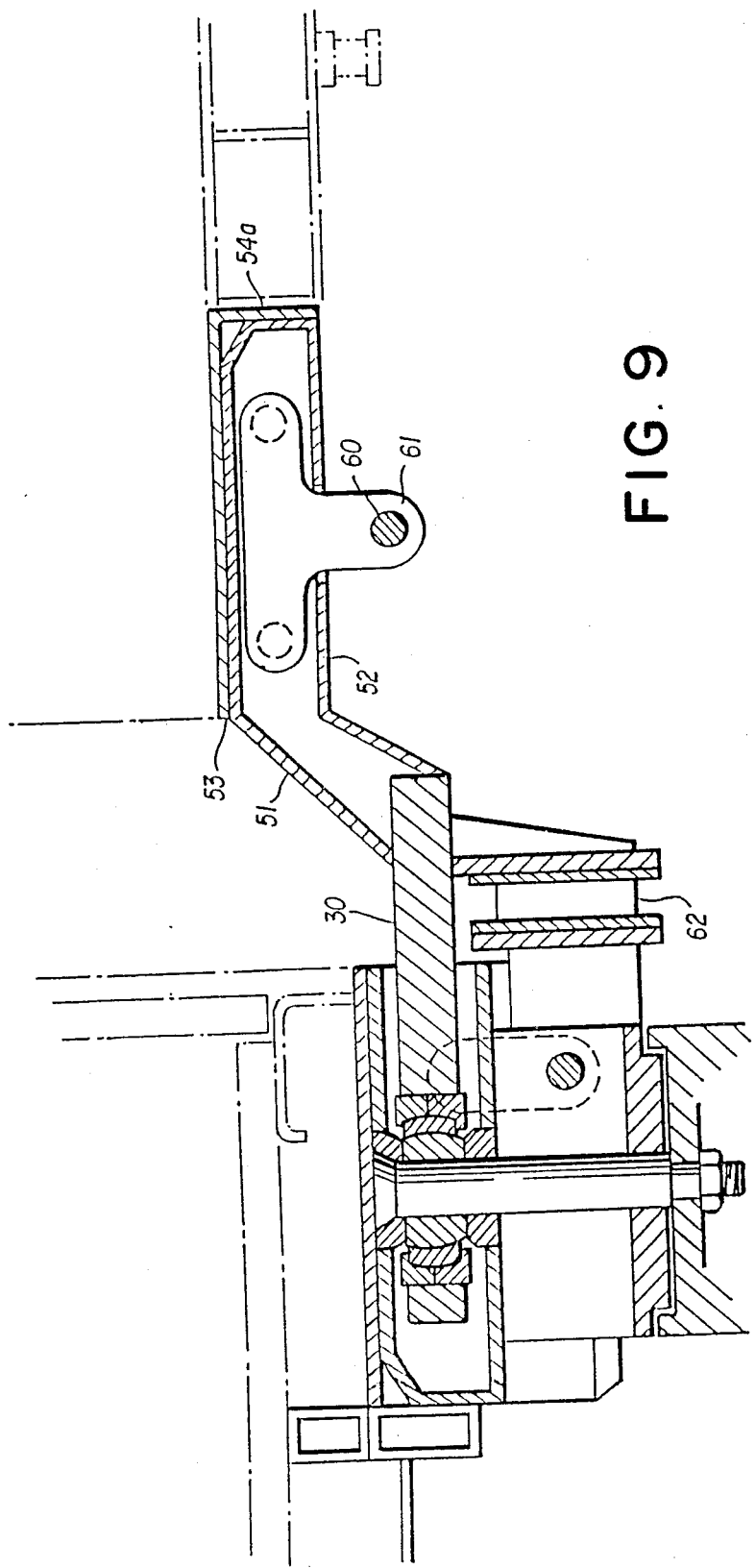
FIG. 9 is a section on line 9—9 of FIG. 8.
Figure 10:
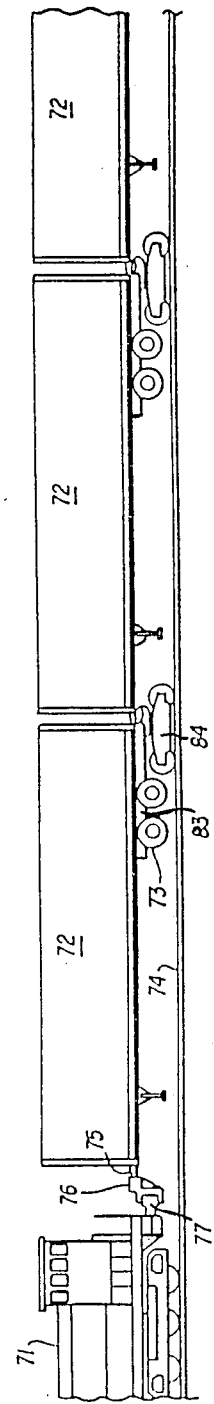
FIG. 10 is a diagrammatic view of another railway train consisting of a locomotive and a plurality of trailers.

In FIGS. 7, 8 and 9, the coupling element 31 has been changed by eliminating the cross member 32 and forks 33 and substituting a flare 51 and a rectangular box section 52. The box section 52 fits into an inverted channel 53 set into the front sill 35 of the front end of the following trailer. The back end of the channel 53 is closed by a cross member 54a which may provide a stop limiting the insertion of the box section 52 of the coupling. When the coupling is inserted in the channel, locking pins 54, 55 carried by member 56 register with mating openings in the adjacent side of the inverted channel 53. Also, locking pins 57, 58 carried by member 59 come opposite or register with openings in the adjacent side of the channel 53. An oppositely threaded drive screw 60 cooperates with tabs 61 projecting from members 56 and 59 through the lower side of the coupling member 52 to move the locking pins in opposite directions through the registering holes in the adjacent channels thereby fixing the front end of the following trailer to the shank 30 of the coupling which is pivoted on the railway bolster by ball pivot 29. Since the channel 53 is open both at the front of the trailer and at the bottom, it is possible to make up the coupling between the channel 53 and the box section 52 either by backing the trailer onto the coupling or by lifting the trailer and dropping it in place on the coupling. The coupling 53 or 52 is resiliently supported on the center plate 25 by a shear sandwich mounting 62 having the same construction and function as the sandwich mounting 45.

In the form of the invention shown in FIGS. 10–15, the train consists of a locomotive 71, and a plurality of trailers 72 connected end to end. When so connected, the road wheels 73 of each trailer are supported above the tracks or rails 74. The trailers are designed for use in a unit train where all of the trailers have a similar frame type or frameless type (monocoque) chassis and coupling structure. The body styles of the trailers may differ in accordance with shipping requirements. The lead trailer in the train has at its front end a load carrying prong 75 fixed to a railway coupler 76 for coupling to the locomotive coupler 77. The trailers in the train are standard highway trailers carried by standard type railway trucks equipped with standard railway type brakes. The highway trailers have additional structure (to be described) to permit the combined railway and highway use. At the front of the trailer, the only modification necessary is the addition of the prong 75.

In the use as a highway trailer, the front end is carried by a fifth wheel pin 82 which is removably locked to the fifth wheel plate of the usual truck tractor. When used in the railway train, the gravity load of the front end of the trailer and the braking (buff) and draft thrusts are all taken through the prong 75 which is rigidly fixed to the front end of the trailer frame. At the back end of the trailer frame, it may be necessary to reposition the road wheels 73 on the subframe 83 so as to have the position shown. The purpose of the subframe 83 and the adjustable mounting for the road wheel is to permit compliance with local laws relating to highway use and/or to allow sufficient space for adaptation to the railway mode. The particular road wheels shown are supported by an air suspension 83a such as manufactured by Neway or Granning so that upon release of the air pressure, the wheels are automatically retracted well above the rails sufficient to meet or exceed normal railroad rail clearance requirements. The lifting means for road wheels in the suspension is not activated until the back end of the trailer is positioned so the load is carried by a standard four wheel railway truck 84, for example, Dresser Model DR-1; Barber Stabilized Truck Mod. S-2-C, or equivalent.

Figure 3:
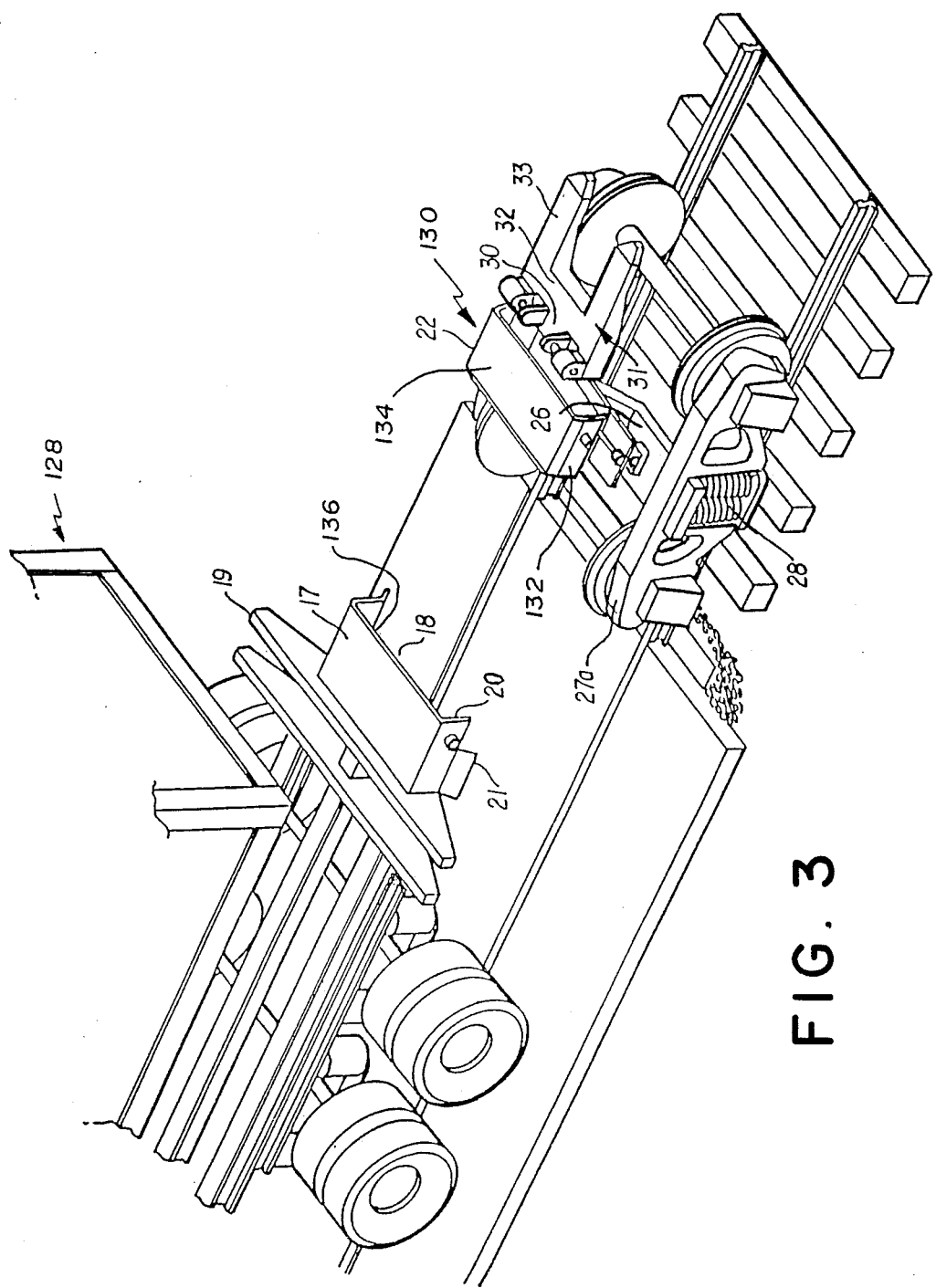
FIG. 3 is a perspective of the back end of a railway highway vehicle and of the railway truck with which it is to be coupled.

The coupling between the truck 84 and the back end of the leading trailer is through an adapter frame 85 rotatably supported on the rail truck bolster 86 by its center plate (thrust bearing) 87. The adapter frame, as shown in FIG. 3, has load carrying fork members 88 which extend through coupling sockets 89 in the rear sill 90. The adapter frame also has latch members 91 which extend through openings 92 in the rear sill 90. When the forks 88 are fully received in the sockets 89, the adapter frame is solidly latched against the rear sill of the lead trailer by the cooperation of the forward ends 93 of the latch members 91 with a latch bar 94.

The gravity load of the back end of the leading trailer is carried by the forks 88 and is transferred by the forks to the center thrust bearing 87. The adapter frame also has sway pads 95 for limiting side sway of the following trailer and linkage mechanism 96 for pivoting the latch members 91 clear of the latch bar 94 and thereby releasing (or engaging) the latches holding the adapter frame against the rear sill of the back end of the trailer.

In the rear sill 90 there is also a socket member 97 carrying an upwardly biased kingpin 98 which is held in the lowered position by linkage 99. The socket member receives the tongue 75 of the following trailer. When the tongue is fully received, the axis of a self aligning bearing 100 in the tongue lines up with the axis of the kingpin 98 so that upon release of the latch mechanism 99 which has been holding the kingpin down, the kingpin is urged upward by a spring into position in the self aligning bearing 100 and positively couples the back end of the leading trailer to the front end of the following trailer. The socket 97 has enough clearance to allow pivoting and rocking of the tongue 75 relative to the socket.

The centerline of the kingpin 98 and the axis of bearing 87 lie on the same vertical axis. The entire gravity load of the back end of the leading trailer and of the front end of the following trailer is transmitted from the rear sill 90 through the forks 88 to the adapter frame and through the bearing 17 to the bolster 16 of the railway truck 14.

Figure 15:
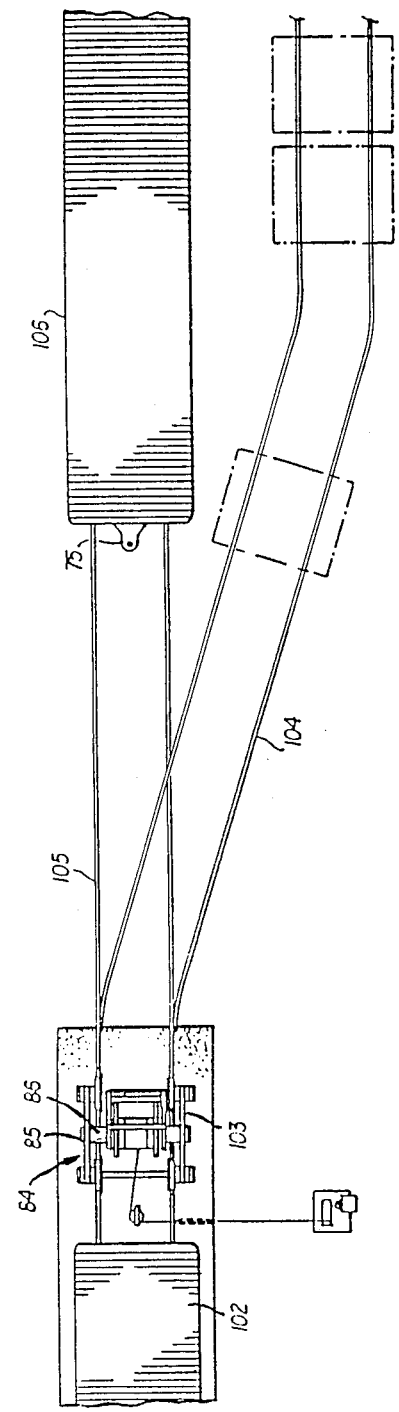
FIG. 15 illustrates a procedure for making up the FIG. 10 train of trailers.
Figure 11:
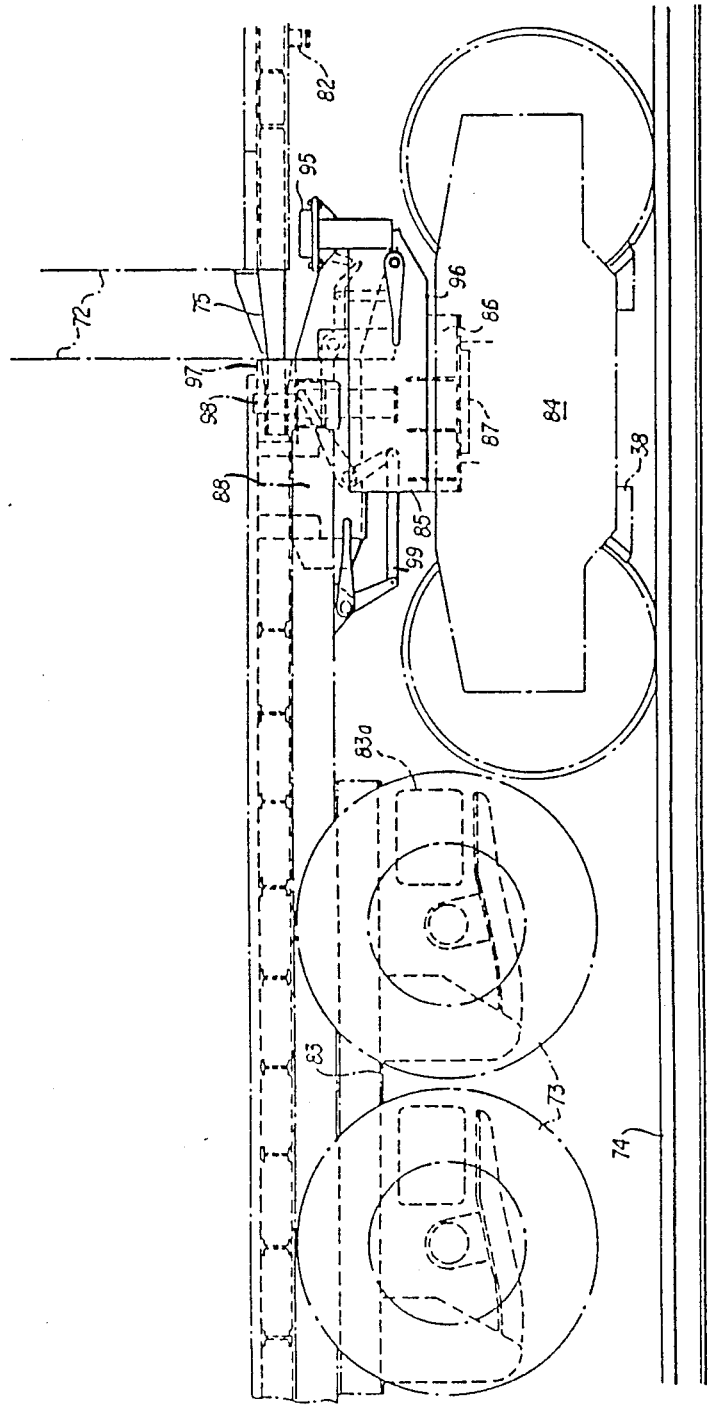
FIG. 11 is a fragmentary side elevation showing the back end of a leading trailer of the FIG. 10 train, the front end of a following trailer, and the railway truck supporting the foregoing.
Figure 12:
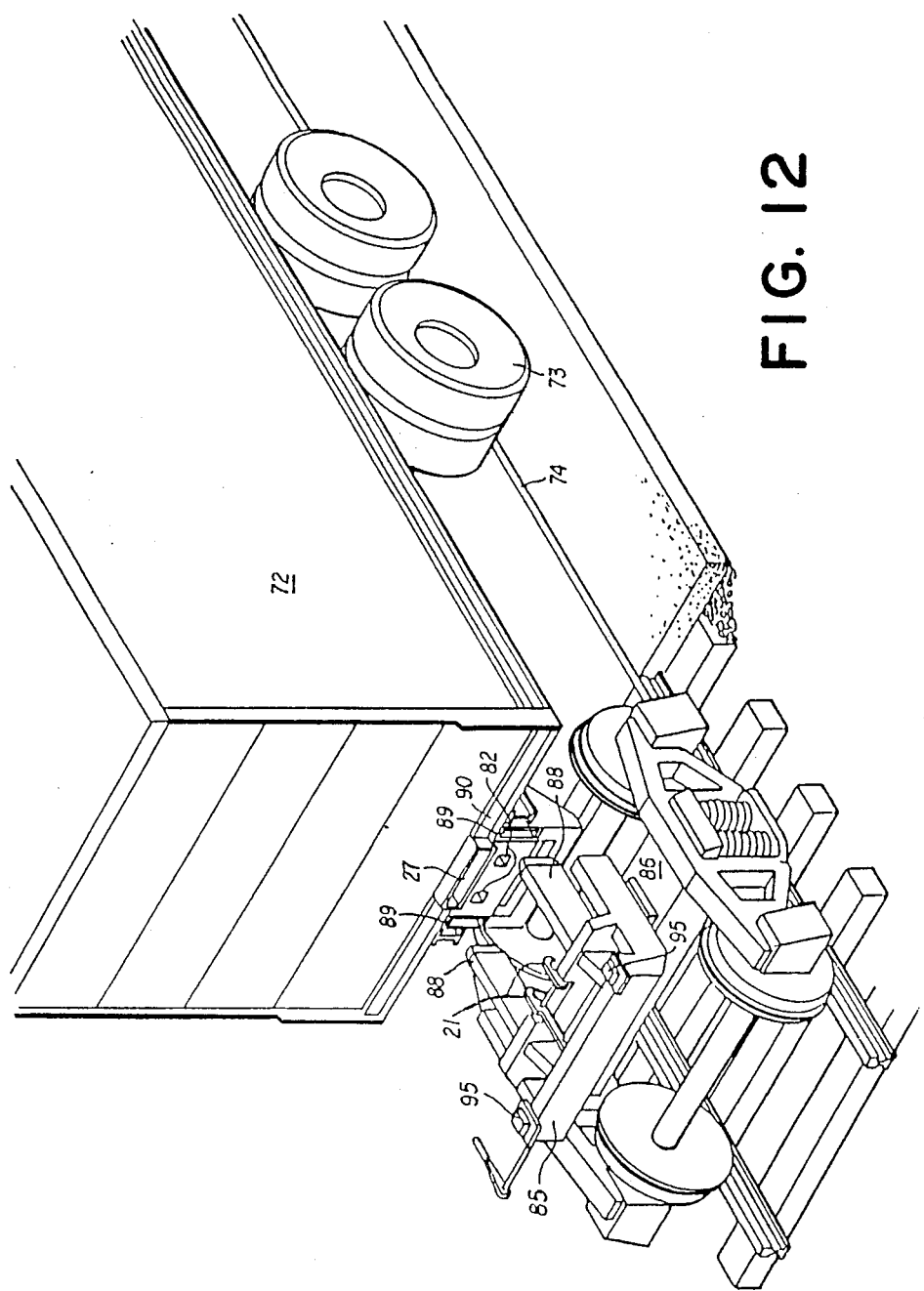
FIG. 12 is an isometric view of the railway truck of the FIG. 10 train in position to be coupled to the back end of the leading trailer.
Figure 13:
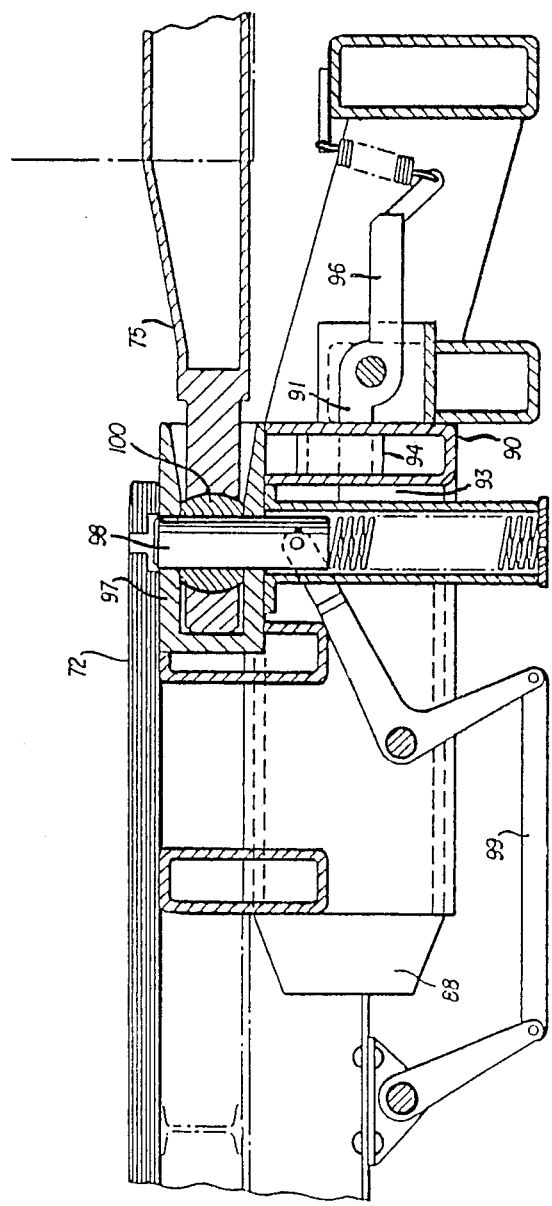
FIG. 13 is a fragmentary section along the centerline of a leading and a following trailer coupled together.
Figure 14:
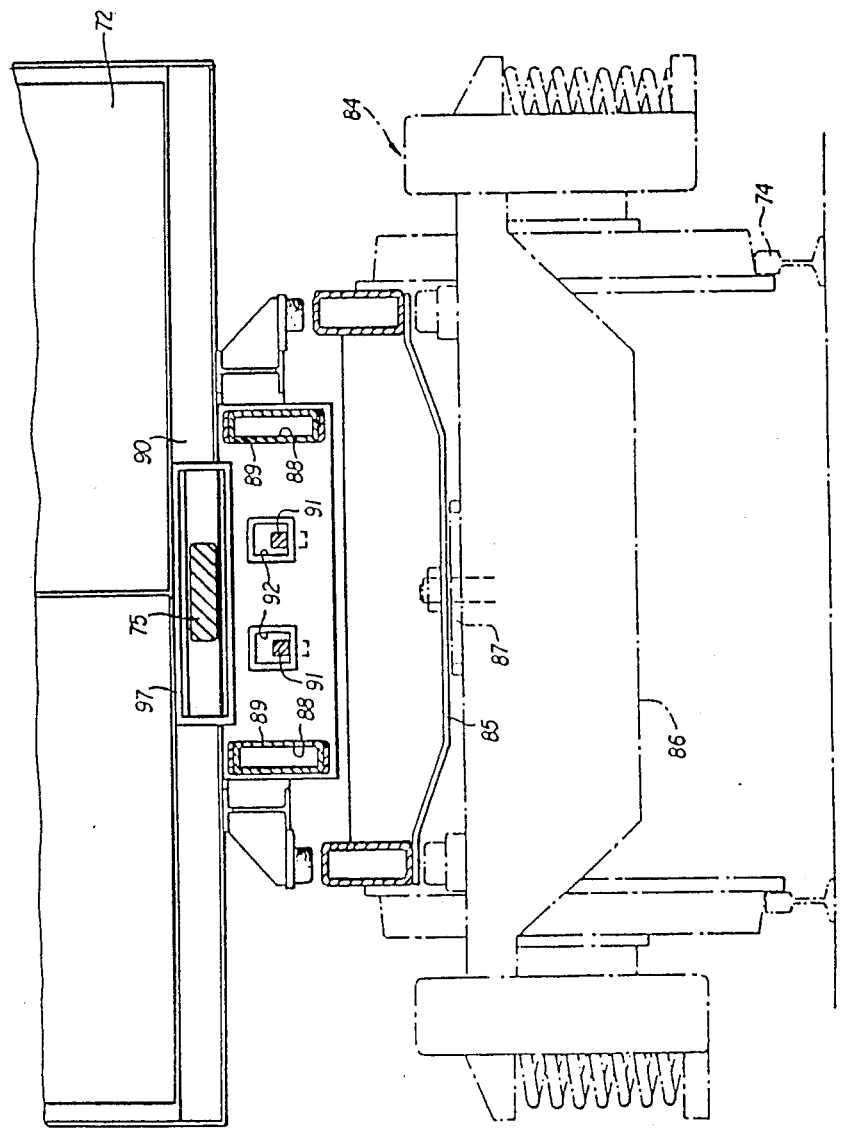
FIG. 14 is a transverse section through the rear sill of the coupling to the leading trailer of FIG. 13.

Making up a train is illustrated in FIG. 15. (1) A trailer 102 is brought to the site by highway tractor. (2) A railway truck 103 with its adapter frame mounted thereon is brought from a spur 104 into loading position on a track 105, directly behind trailer 102. (3) The trailer 102 is backed toward the railway truck 103 until forks 88 on the railway truck are received in sockets 89 on the trailer and latches 91 are latched over the latch bar 94 on the trailer and the back of the trailer 100 is latched to the railway truck 103. The air is then released from trailer suspension 83a and the trailer road wheels are lifted above the track 105. The trailer 102 and truck 103 are backed as a unit into trailer 106 having its front end supported by its retractable stand or landing gear, the tongue 75 of trailer 106 being received in socket 97 in trailer 102 and the kingpin 98 is then released to complete the coupling of the back end of trailer 102 and the front end of trailer 106 to the truck 103. Upon retracting the landing gear for trailer 106 and connecting the air brake lines to the brakes 108 for truck 103, the trailers 102 and 106 are ready for railway use.

I claim:

1. A railway train comprising a plurality of end to end highway trailer vehicles, each having its highway engaging wheels supported above a railway track, a railway truck having railway wheels on said track and a bolster with a load carrying thrust bearing, and frame means supported by said thrust bearing for rotation about a vertical axis, said frame means having a first coupling means mating with complementary coupling means in the back end of one of said trailers, to releasably fix said frame means to said back end of said one of the trailers and positively prevent rotation of said back end of said one trailer relative to said frame means while said frame means rotates about said vertical axis, said complementary coupling means having a channel with laterally spaced vertical planar surfaces engaging parallel laterally spaced vertical planar surfaces on said first coupling means, in which the engaging surfaces are releasably connected by pins transverse to said surfaces.

2. The structure of claim 1 in which the first coupling means is stopped against an end sill of one of said trailers and the complementary coupling has flanges outstanding from said sill and pinned to the flange of said first coupling means.

3. The structure of claim 1 in which a ball bearing is pinned to other upper end of the frame means on said vertical axis, and an arm fixed to the front end of the trailer following said one trailer is pivoted on said ball.

4. A railway train comprising a plurality of end to end highway trailer vehicles, each having its highway engaging wheels supported above a railway track, a railway truck having railway wheels on said track and a bolster with a load carrying thrust bearing, and a frame supported by said bearing for rotation about a vertical axis, said frame having a first load carrying coupling engaged with second complementary load carrying coupling on the centerline of one of said trailers, said couplings each having laterally spaced vertically extending longitudinal sides, the sides of one coupling being in telescoping relation to the sides of the other coupling, and horizontal latch pins extending through the sides of the couplings for holding the couplings coupled.

5. The structure of claim 4 in which the first and second couplings are pinned together by retractable pins.

6. The structure of claim 4 in which pivoting of one trailer about said vertical axis is effected by pivoting of said frame on said thrust bearing.

7. The structure of claim 4 in which the railway wheels are mounted in side frames and the bolster is resiliently supported by said side frames.

8. The structure of claim 4 in which the couplings are at least one horizontal channel and bar received in the channel.

9. The structure of claim 8 in which the channels are open at one end to receive the bars by relative movement lengthwise of the channels.

10. A railway train comprising a plurality of end to end highway trailer vehicles each having its highway engaging wheels supported above a railway track, a railway truck having railway wheels on the track and a bolster with a load carrying thrust bearing, an adapter frame supported by said bearing for rotation about a vertical axis, said trailer having at its front end a front sill, a load carrying arm on said adapter frame stopped against said sill, said sill and said arm having on opposite sides of the center line of the trailer laterally spaced interengaging flanges and retractable pins extending through said flanges for releasably locking said arm to said sill.

11. A railway train comprising a plurality of end to end highway trailer vehicles, each having its highway engaging wheels supported above a railway track, a railway truck having railway wheels on said track and a bolster with a load carrying thrust bearing, and frame means supported by said thrust bearing for rotation about a vertical axis, said frame means having a first coupling means mating with complementary coupling means in the back end of one of said trailers, to releasably fix said frame means to said back end of said one of the trailers and positively prevent rotation of said back end of said one trailer relative to said frame means while said frame means rotates about said vertical axis, said complementary coupling means having a channel with laterally spaced vertical planar surfaces engaging parallel laterally spaced vertical planar surfaces on said first coupling means, in which the engaging surfaces are releasably connected by pin means transverse to said surfaces.

12. A combination comprising:
a railway truck (4) having railway wheels supportable on a track (6) and a bolster (26) with a load carrying thrust bearing (25);
frame means (130) supported by said thrust bearing 25 for rotation thereon about a vertical axis;
the frame means (130) including first coupling means (22) having a pair of substantially vertical sidewalls (132) and an upwardly facing substantially horizontal surface (134) located above the thrust bearing (25,87);
a highway trailer vehicle (72) having highway engaging wheels supportable above a railway track;
complementary coupling means (17) located beneath and fixably connected to a rear end portion (15) of the trailer vehicle;
the complementary coupling means (17) including a pair of substantially vertical sidewalls (20) and a downwardly facing substantially horizontal surface (136); and
means (23) for releasably connecting the first coupling means (22) to the complementary coupling means (17), whereby the first coupling means may substantially mate with the second coupling means to releasably fix the highway trailer to said frame means (130) with the sidewalls (132) of the first coupling means being in substantially side-by-side position with the sidewalls (20) of the complementary coupling means (17), and with the downwardly facing horizontal surface (136) of the complementary coupling means (17) being on top of the upwardly facing substantially horizontal surface (134) of the first coupling means (22) in load bearing contact.

13. A combination according to claim 12 in which:
the complementary coupling means (17) has opposing substantially vertical sidewalls (20) and a downwardly facing substantially horizontal surface (136);
the first coupling means (22) substantially mates with the complementary coupling means (17) to position said frame means to said back end of said trailer; and
the mating of the first coupling means (22) to the complementary coupling means (17) places a substantially vertical sidewall of each coupling means in substantially side-by-side position with each other.

14. A combination according to claim 12 in which when the first coupling means (22) and the complementary coupling means (17) are in substantially mating position, positive rotation about a vertical axis is prevented between the trailer and the frame means 130 while the frame means rotates on the thrust bearing about said vertical axis.

15. A combination according to claim 12 in which the said horizontal surfaces (134,136) are wider than the thrust bearing.

16. A combination according to claim 12 in which the means (23) for releasably connecting and disconnecting the first coupling means (22) to and from the complementary coupling means (17) includes pin means (23) which extends through the mating sidewalls (20,132).

17. A combination according to claim 12 in which the horizontal surface (134) of the first coupling means (22) includes a forwardly and downwardly extending end portion acting as a guidance ramp.

18. A railway train comprising a plurality of end to end highway trailer vehicles, each having its highway engaging wheels supported above a railway track, a railway truck having railway wheels on said track and a bolster with a load carrying thrust bearing, and frame means supported by said thrust bearing for rotation about a vertical axis, said frame means having a first coupling means mating with complementary coupling means in the back end of one of said trailers, to releasably fix said frame means to said back end of said one of the trailers and positively prevent rotation of said back end of said one trailer relative to said frame means while said frame means rotates about said vertical axis, said complementary coupling means having a channel with laterally spaced substantially vertical planar surfaces engaging parallel laterally spaced substantially vertical planar surfaces on said first coupling means, in which the engaging surfaces are releasably connected by pin means transverse to said surfaces;
said complementary coupling means being made up with said first coupling means by lowering said one end of said one trailer onto said first coupling means to permit making (or disconnecting) the coupling connection.

19. A railway train comprising a plurality of end to end highway trailer vehicles, each having its highway engaging wheels supported above a railway track, a railway truck having railway wheels on said track and a bolster with a load carrying thrust bearing, and frame means supported by said thrust bearing for rotation about a vertical axis, said frame means having a first coupling means mating with complementary coupling means in the back end of one of said trailers, to releasably fix said frame means to said back end of said one of the trailers and positively prevent rotation of said back end of said one trailer relative to said frame means while said frame means rotates about said vertical axis, said complementary coupling means having a channel with laterally spaced substantially vertically planar surfaces engaging parallel laterally spaced substantially vertical planar surfaces on said first coupling means, in which the engaging surfaces are releasably connected by pin means transverse to said surfaces;

said complementary coupling means being made up with said first coupling means by backing said one end of said one trailer onto said first coupling means to permit making (or disconnecting) the coupling connection at locations where trailer lifting equipment is not available.

20. Apparatus comprising:
a dual-mode rail-highway semi-trailer comprising a body, a highway wheel-set axle unit, spring means supporting said body on said highway wheel-set axle unit, means to selectively raise said highway wheel-set axle unit to an inoperative position and to lower the same into a ground-engaging operative position for over-the-road highway travel;

a track-engaging railroad truck having railway wheels which engage a track and with the truck including a bolster with a load carrying thrust bearing;

a frame means supported by the bolster thrust bearing so that the frame means can rotate about a vertical axis relative to the bolster;

the frame means having a first coupling means mating with complementary coupling means at the end of the trailer to releasably couple the frame means to the end of the trailer and positively prevent rotation of the end of the trailer relative to the frame means while frame means rotates about said vertical axis, the complementary coupling means being releasably coupled to the first coupling means by lowering the end of the trailer onto the first coupling means to permit making or disconnecting the coupling connection;

the frame means remaining with the truck when uncoupled from the trailer; and means to couple the trailers into a train.

21. A stand-alone railroad bogie adapted to be removably coupled to an over-the-road travel semi-trailer to convert the semi-trailer to rail mode travel, the bogie comprising:
two axles;
bogie wheels supporting said axles;
a frame supporting said axles;
a central bogie bolster arranged between said axles, a pocket in said bogie bolster, and a mounting member held in said pocket so as to permit limited bearing movement of the mounting member relative to said pocket;

a substantially planar covering surface fixed to said mounting member for preventing ingress of dirt and moisture into said pocket from above; and a quick-release coupling part mounted on said covering surface for engagement with a cooperating quick-release coupling part on a semi-trailer (1) whereby a semi-trailer is removably couplable to the bogie without removing the mounting member from the pocket.

22. A road and rail transport system comprising:
a plurality of semi-trailers, each semi-trailer comprising a body member, road wheels fixed to said body member's trailing end for supporting said semi-trailer during over-the-road travel, connecting means fixed to said body member's leading end for connecting said semi-trailer to a tractor unit, a body bolster fixed to each end of said body member;

body member coupling means connected to each body bolster that cooperates to permit a leading end of a first semi-trailer to be releasably coupled directly to a trailing end of a second semi-trailer for allowing movement of one semi-trailer relative to the other about a first substantially vertical axis and for allowing part of the load of each said semi-trailer to be transmitted along said vertical axis;

a plurality of bogies, each bogie comprising two axles, bogie wheels mounted on said axles, a frame supporting said axles, a central bogie bolster arranged between said axles, a pocket formed in said bogie bolster, a mounting member mounted in said pocket for limited bearing movement relative to said pocket, and a substantially planar covering surface fixed to said mounting member to prevent ingress of dirt and moisture in said pocket from above; and quick release bogie/semi-trailer coupling means having a first part mounted on the covering surface of said bogie's mounting member and a second part mounted on a semi-trailer's trailing end body bolster, said bogie/semi-trailer coupling means permitting said semi-trailer to pivot relative to said bogie about a second substantially vertical axis passing through the center of said pocket and mounting member, said second vertical axis substantially coinciding with said first vertical axis;

said bogie/semi-trailer coupling means permitting trains of bogies and semi-trailers to be readily assembled where said bogies are always used together with said semi-trailers in said system's rail mode but where said semi-trailers are demountable from said bogies and used independent therefrom in said system's road mode.

23. The system of claim 22, the leading end of a second semi-trailer being pivotally connected to the trailing end of a first semi-trailer by said body member coupling means when the trailing end of a said first semi-trailer is connected to a bogie by said bogie/semi-trailer coupling means so that part of the load of said second semi-trailer is transmitted to that bogie connected to said first semi-trailer.

24. The system of claim 22, each semi-trailer comprising:
means for lifting said road wheels out of contact with the ground when said semi-trailer is connected to and support on a bogie.

25. The system of claim 23, said body member coupling means comprising:
a tongue at one end of said semi-trailer and a slot at the other end of said semi-trailer, the tongue of a second semi-trailer being adapted for mating engagement with the slot of a first semi-trailer.

26. The system of claim 22 comprising:
an adapter bogie for establishing a connection between the leading semi-trailer of a train of semi-trailers connected to bogies, and a locomotive for that train.

* * * * *